United States Patent
Barsness et al.

(10) Patent No.: US 8,688,646 B2
(45) Date of Patent: *Apr. 1, 2014

(54) SPECULATIVE EXECUTION IN A REAL-TIME DATA ENVIRONMENT

(71) Applicant: International Business Machines Corporation, Armonk, NY (US)

(72) Inventors: Eric L. Barsness, Pine Island, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/680,586

(22) Filed: Nov. 19, 2012

(65) Prior Publication Data

US 2013/0080400 A1      Mar. 28, 2013

Related U.S. Application Data

(63) Continuation of application No. 12/882,341, filed on Sep. 15, 2010, now Pat. No. 8,423,516.

(51) Int. Cl.
  *G06F 7/00*  (2006.01)
  *G06F 17/00*  (2006.01)

(52) U.S. Cl.
  USPC ......................................... 707/687

(58) Field of Classification Search
  USPC .......................................... 707/687, 999.002
  See application file for complete search history.

(56) References Cited

U.S. PATENT DOCUMENTS

| | | | |
|---|---|---|---|
| 5,748,936 A | 5/1998 | Karp et al. | |
| 6,513,004 B1 | 1/2003 | Rigazio et al. | |
| 8,266,111 B2 | 9/2012 | Lin et al. | |
| 2006/0095672 A1 | 5/2006 | Andrews et al. | |
| 2006/0218123 A1* | 9/2006 | Chowdhuri et al. | 707/2 |
| 2009/0171999 A1* | 7/2009 | McColl et al. | 707/101 |
| 2009/0254916 A1* | 10/2009 | Bose et al. | 718/104 |
| 2010/0191698 A1 | 7/2010 | Tyler | |
| 2012/0066184 A1 | 3/2012 | Barsness et al. | |

FOREIGN PATENT DOCUMENTS

WO    WO0029939 A1 *  5/2000  ............... G06F 9/38

* cited by examiner

*Primary Examiner* — Aleksandr Kerzhner

(74) *Attorney, Agent, or Firm* — Patterson & Sheridan LLP (57) ABSTRACT

Techniques are described for speculatively executing operations on data in a data stream in parallel in a manner that increases the efficiency of the stream-based application. In addition to executing operations in parallel, embodiments of the invention may determine whether certain results produced by the parallel operations are valid results and discard any results determined to be invalid.

11 Claims, 6 Drawing Sheets

SPECULATIVE EXECUTION IN A REAL-TIME DATA ENVIRONMENT

CROSS-REFERENCE TO RELATED APPLICATIONS

This application is a continuation of U.S. patent application Ser. No. 12/882,341, filed Sep. 15, 2010, now issued as U.S. Pat. No. 8,423,516. The aforementioned related patent application is herein incorporated by reference in its entirety.

BACKGROUND

While computer databases have become extremely sophisticated, the computing demands placed on database systems have also increased at a rapid pace. Database systems are typically configured to separate the process of storing data from accessing, manipulating, or using data stored in the database. More specifically, databases use a model where data is first stored, then indexed, and then queried. However, this model cannot meet the performance requirements of some real-time applications. For example, the rate at which a database system can receive and store incoming data can limit how much data can be processed or otherwise evaluated. This, in turn, can limit the ability of database applications to process large amounts of data in real-time.

SUMMARY

One embodiment of the invention provides a computer-implemented method and system for processing a data stream. The method and system include executing a first operation on a first tuple of the data stream by a first processing element to produce a first result tuple. Additionally, the method and system include executing a second operation on the first tuple of the data stream by a second processing element, wherein the second operation is executed in parallel with the first operation. The method and system also include determining one or more attributes of the first tuple used in executing the second operation on the second processing element. Further, the method and system include comparing the determined one or more attributes of the first tuple with attributes of the first result tuple produced by executing the first operation by the first processing element, to determine whether the second operation executed by the second processing element is valid.

Another embodiment of the invention provides a computer-implemented method and computer program product for processing a data stream. The method and computer program product include executing a first operation on a first tuple of the data stream by a first processing element. Additionally, the method and computer program product include calculating a utility value for processing the first tuple of the data stream by a second processing element in parallel to executing the first operation on the first processing element. The method and computer program product also include, upon determining the calculated utility value exceeds a threshold utility value, executing a second operation on the first tuple of the data stream by the second processing element, wherein the second operation is executed in parallel with the first operation.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, and often in milliseconds. Constructing a database application using this type of processing opens up a new programming paradigm allowing for a broad variety of innovative applications, systems, and processes to be developed, as well as present new challenges for application programmers and database developers.

In a stream application, operators are connected to one another such that data flows from one processing element to the next (e.g. over a TCP/IP socket). Scalability is reached by distributing an application across nodes by creating many small executable pieces of code (operators), as well as replicating processing elements on multiple nodes and load balancing among them. Processing elements (and operators) in a stream application can be fused together to form a larger processing element. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream application, as well as fused or un-fused from a stream application during runtime.

One advantage to stream applications is that they allow the user to granularly control the process flow of data through the application. In other words, the user may designate specific operators for each processing element that perform various operations on the incoming data, and may dynamically alter the stream application by modifying the operators and the order in which they are performed. Additionally, stream applications are able to handle large volumes of data while limiting any "bottlenecks" in the processing. Nonetheless, in many cases, bottlenecks will still arise that may cause parts of the stream application to slow down. Furthermore, the problems created by such a bottleneck may continue to compound as additional data is received. As such, for stream applications where the incoming data must be processed as close to real-time as possible, any potential bottlenecks should be avoided, as they may have a severe impact on the application's performance and the application's ability to process the incoming data in real-time. Furthermore, because of the sheer amount of data being processed and because the data must be processed as close to real-time as possible, any performance gains to such a stream application can be advantageous.

Embodiments of the invention provide techniques for identifying stream data that may be processed in parallel on different processing elements of a system, and upon identifying any such data, processing the identified data in parallel. In particular, embodiments of the invention provide techniques for processing an incoming tuple of a data stream using a first processing element, and processing the incoming tuple of the data stream in parallel using a second processing element. Once the first processing element finishes processing the incoming tuple, embodiments of the invention may determine whether the processing by the second processing element has or will produce a valid result, based on the result produced by the first processing element, and discard any invalid results.

For example, assume that a first processing element of a stream application does not modify any data in the incoming tuple of the data stream when processing the tuple. In such an example, embodiments of the invention may determine that a second processing element may process the incoming tuple of data in parallel with the first processing element, because the second processing element does not rely on a result produced by the first processing element. However, as a second example, assume the first processing element adds an attribute to the tuple of data as part of its processing. In this second example, embodiments of the invention may determine that the second processing element should wait to process the tuple until the first processing element finishes processing the tuple, because the second processing element requires the attribute added to the tuple by the first processing element for its processing. Thus, in this second example, because any processing done in parallel by the second processing element would produce an invalid result, embodiments of the invention may refrain from processing the incoming tuple on the second processing element in parallel with the first processing element. Additionally, in one embodiment of the invention, the second processing element may process the tuple in parallel so long as any attributes modified by the first processing element are not material to the processing by the second processing element.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream application may be virtual machines hosted by a cloud service provider. Doing so allows a user to access this information from any computing system attached to a network connected to the cloud (e.g., the Internet).

Figure 1A:
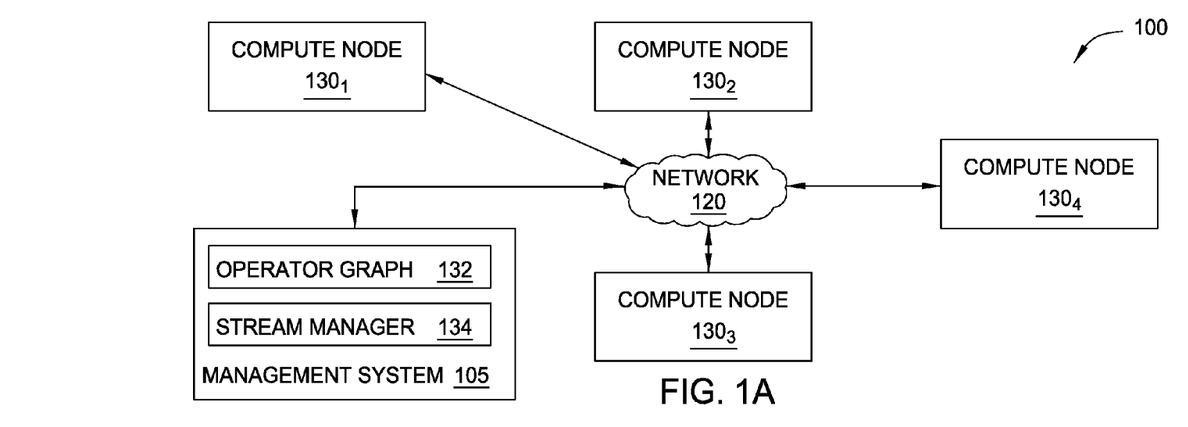
FIGS. 1A-1B illustrate a computing infrastructure 100 configured to execute a stream application, according to one embodiment of the invention.
Figure 1B:
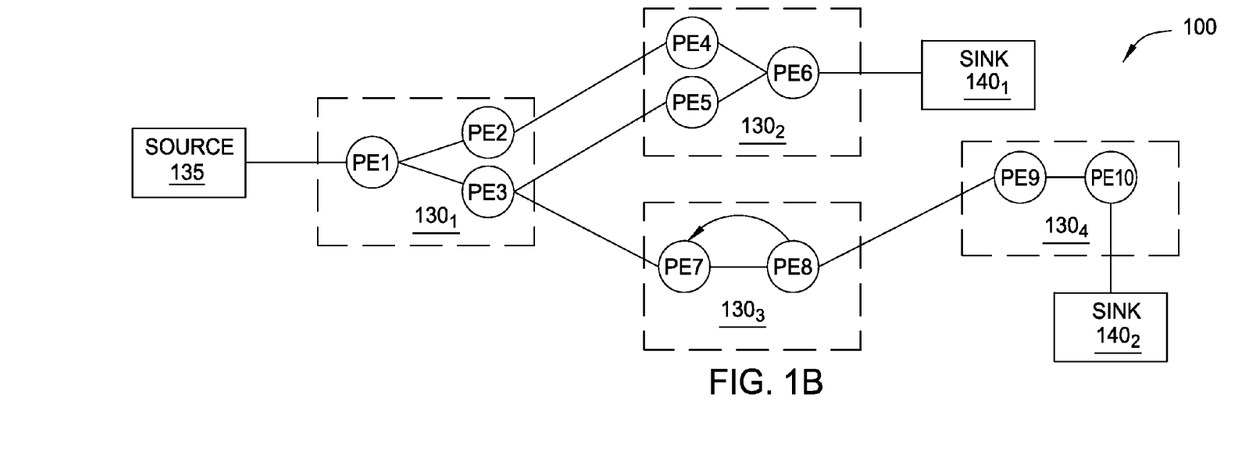

FIGS. 1A-1B illustrate a computing infrastructure 100 configured to execute a stream application, according to one embodiment of the invention. As shown, the computing infrastructure 100 includes a management system 105 and a plurality of compute nodes $130_{1-4}$, each connected to a communications network 120. Also, the management system 105 includes an operator graph 132 and a stream manager 134. As described in greater detail below, the operator graph 132 represents a stream application beginning from one or more source processing elements (PEs) through to one or more sink PEs. This flow from source to sink is also generally referred to herein as an execution path. Generally, data elements flow into a source PE of a stream application and are processed by that PE. Typically, processing elements receive an N-tuple of data elements from the stream as well as emit an N-tuple of data elements into the stream (except for a sink PE where the stream terminates). Of course, the N-tuple received by a processing element need not be the same N-tuple sent downstream. Additionally, the processing elements could be configured to receive or emit data in formats other than an N-tuple (e.g., the processing elements could exchange data marked up as XML documents). Furthermore, each processing element may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream application running on the compute nodes $130_{1-4}$, as well as to change the structure of the operator graph 134. For example, the stream manager 134 may move processing elements (PEs) from one compute node 130 to another, for example, to manage the processing loads of the compute nodes 130 in the computing infrastructure 100. Further, stream manager 134 may control the stream application by inserting, removing, fusing, un-fusing, or otherwise modifying the processing elements (or what data-tuples flow to the processing elements) running on the compute nodes $130_{1-4}$. In one embodiment of the invention, the management system 105 may maintain multiple operator graphs 132. In such an embodiment, one operator graph 132 designated as primary operator graph, which represents the general or default processing flow, and the other operator graphs may represent alternate processing flows.

FIG. 1B illustrates an example operator graph that includes ten processing elements (labeled as PE1-PE10) running on the compute nodes $130_{1-4}$. While a processing element may be executed as an independently running process with its own process ID (PID) and memory space, multiple processing elements may also be fused to run as single process (with a PID and memory space). In cases where two (or more) processing elements are running independently, inter-process communication may occur using a network socket (e.g., a TCP/IP socket). However, when processes are fused together, the fused processing elements can use more rapid communication techniques for passing N-tuples (or other data) among processing elements (and operators in each processing element).

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. For example, PE1 may split data elements received in a tuple and pass some data elements to PE2, while passing other data elements to PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Figure 2:
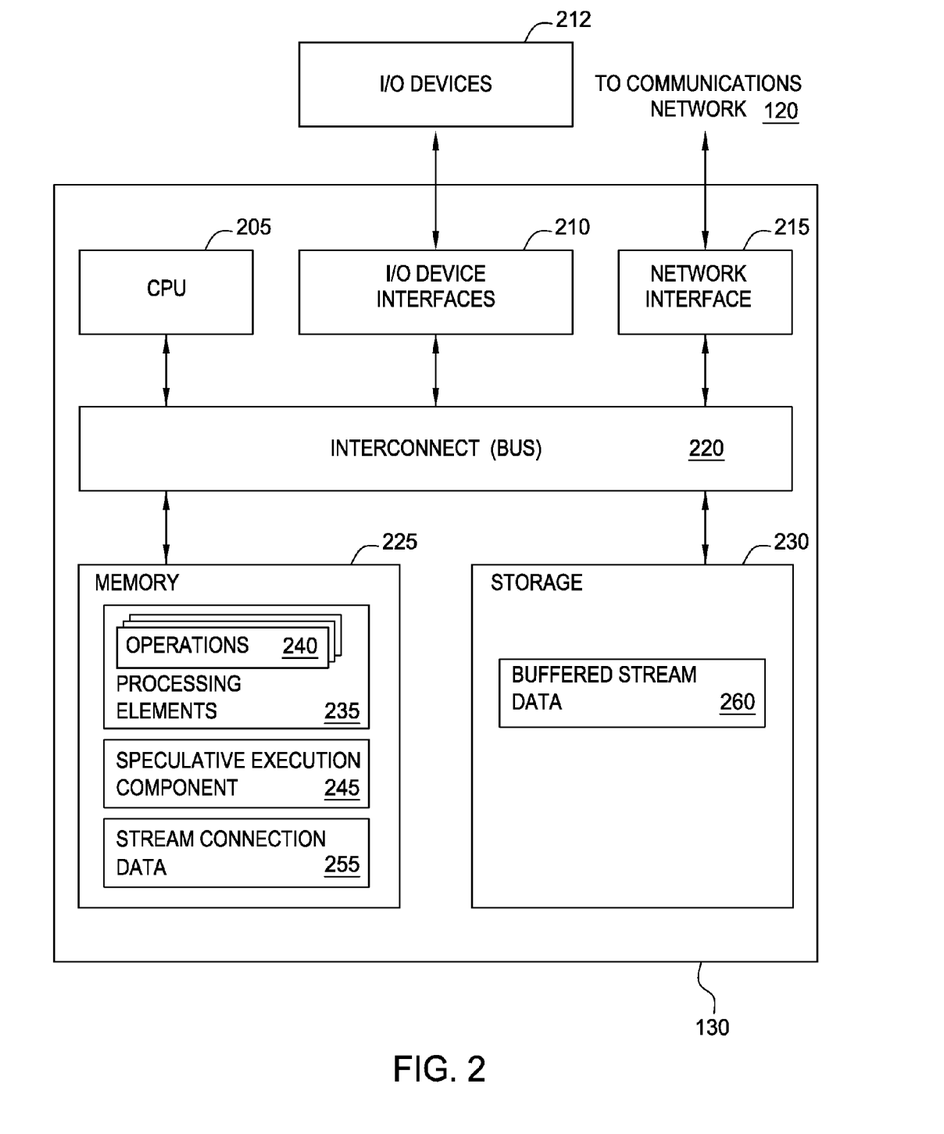
FIG. 2 is a more detailed view of the compute node 130 of FIGS. 1A-1B, according to one embodiment of the invention.

FIG. 2 is a more detailed view of the compute node 130 of FIGS. 1A-1B, according to one embodiment of the invention. As shown, the compute node 130 includes, without limitation, a central processing unit (CPU) 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive, solid state device (SSD), or flash memory storage drive, may store non-volatile data.

In this example, the memory 225 includes a plurality of processing elements (PE) 235, a speculative execution (SE) component 245, and stream connection data 255. Each PE 235 includes a collection of operators 240. As noted above, each operator 240 may provide a small chunk of executable code configured to process data flowing into a processing element (e.g., PE 235) and to emit data to other operators 240 in that PE and to other PEs in the stream application. Such PEs may be on the same compute node 130 or on other compute nodes accessible over the data communications network 120. The stream connection data 255 represents the connections between PEs on compute node 130 (e.g., a TCP/IP socket connection between two separate PEs 235), as well as connections to other compute nodes 130 with upstream and or downstream PEs in the stream application, also via TCP/IP sockets (or other inter-process data communication mechanisms).

Buffered stream data 260 represents a storage space for data flowing into the compute node 105 from upstream processing elements (or from a data source for the stream application). For example, buffered stream data may include data tuples waiting to be processed by one of the PEs 235. Buffered stream data 260 may also store the results of data processing performed by PEs 235 that will be sent to downstream processing elements.

Generally, the SE component 245 may determine whether a particular tuple of a data stream may be executed in parallel on two or more processing elements 245. In particular, when an incoming tuple of data is received, the SE component 245 may determine whether the received tuple must be processed in a pipelined fashion (e.g., one processing element 235 at a time), or whether the received tuple can be processed in parallel (e.g., two or more processing elements 235 processing the tuple at the same time). As an example, assume the system 130 contains three processing elements 235—PE1, PE2 and PE3. Further, assume that the normal processing path for the exemplary system is PE1, then PE2, then PE3, and that only PE3 modifies the data in the tuple during processing. In this example, the SE component 245 may determine that incoming tuples may be executed in parallel on all three processing elements 235 at once, because only the last processing element 235 in the execution path (i.e., PE3) modifies the attributes of the tuple.

As a second example, assume that PE1 also modifies the incoming tuple by adding an attribute to the tuple. In this second example, the SE component 245 may determine that incoming tuples of data may not be processed in parallel, because to do so would omit consideration of the attribute added by PE1 in the processing by processing elements 235 PE2 and PE3. These examples are for illustrative purposes and without limitation, as of course the SE component 245 may consider other factors as well in making its determination.

Figure 3:
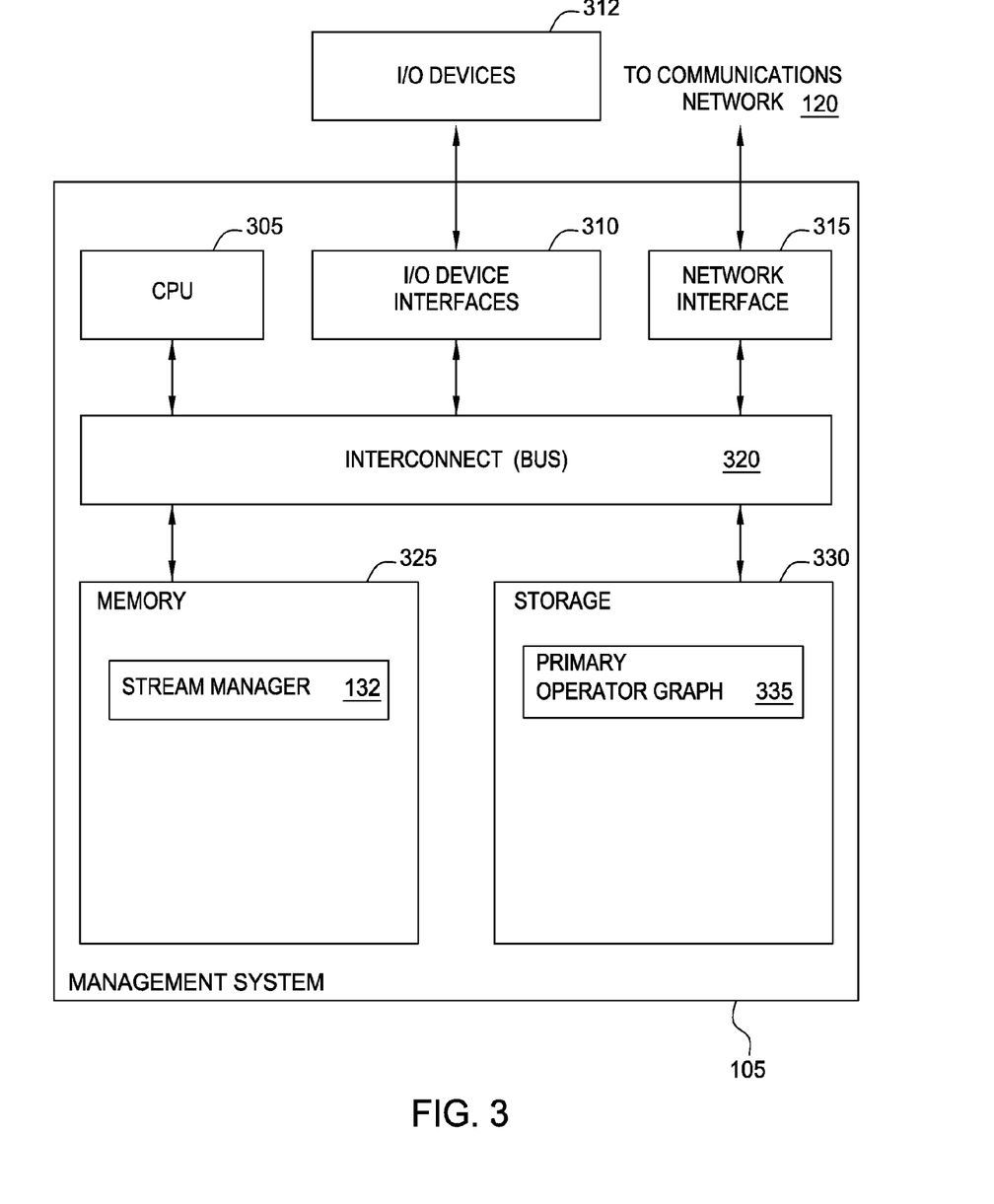
FIG. 3 is a more detailed view of the server computing system 105 of FIG. 1, according to one embodiment of the invention.

FIG. 3 is a more detailed view of the server computing system 105 of FIG. 1, according to one embodiment of the invention. As shown, server computing system 105 includes, without limitation, a central processing unit (CPU) 305, a network interface 315, an interconnect 320, a memory 325, and storage 330. The client system 130 may also include an I/O device interface 310 connecting I/O devices 312 (e.g., keyboard, display and mouse devices) to the server computing system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 132. Additionally, the storage 330 includes a primary operator graph 335 and an alternate operator graph 340. The stream manager 132 may generally route tuples received as part of a data stream to PEs 235 to be processed, according to the primary operator graph 335. In one embodiment of the invention, the SE component 245 uses information from the primary operator graph 335 in determining whether incoming tuples may be processed in parallel. For example, the SE component 245 may use the primary operator graph 335 to determine which processing elements 235 will process an incoming tuple, and in what order they will process the tuple. The SE component 245 may obtain information in the primary operator graph 335 by, for instance, requesting a copy of the primary operator graph 335 from the stream manager 132. In another embodiment, the SE component 245 may request specific information from the primary operator graph 335 from the stream manager 132, as it is needed. The SE component 245 may then use this information to determine whether incoming tuples of data may be processed in parallel, and if so, when and on which processing elements 235.

Figure 4:
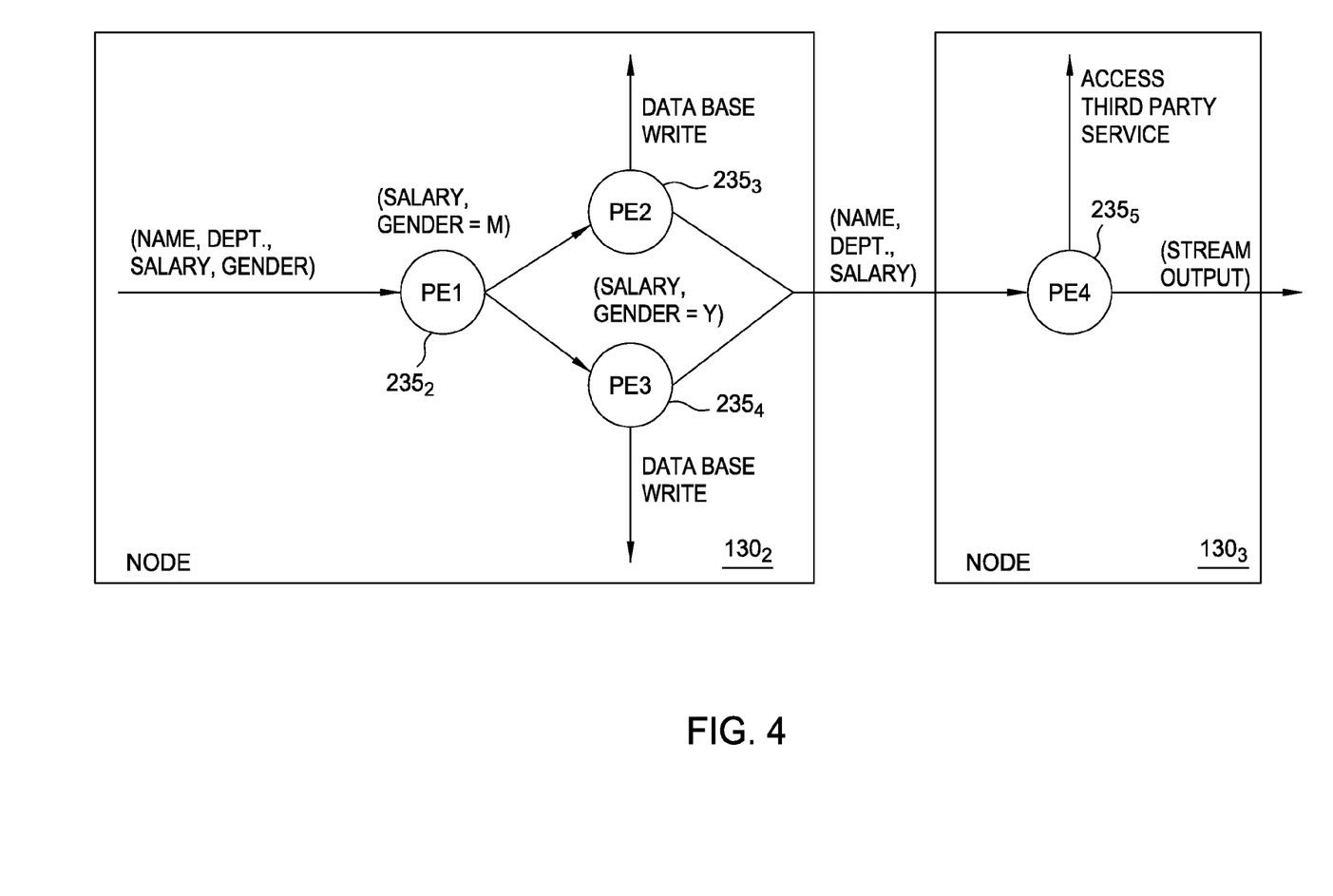
FIG. 4 illustrates exemplary compute nodes in a stream application, according to one embodiment of the invention.

FIG. 4 illustrates exemplary compute nodes in a stream application, according to one embodiment of the invention. As shown, the exemplary environment includes compute nodes $130_2$ and $130_3$. Compute node $130_2$ includes three processing elements $235_2$, $235_3$ and $235_4$ (labeled PE1-PE3). In the depicted example, processing element $235_2$ receives an N-tuple data stream and emits an N-tuple to processing elements $235_3$ and $235_4$ (labeled PE2 and PE3, respectively) on compute node $130_3$. Processing elements PE2 and PE3, in turn, emit N-tuples to processing element $235_5$ on compute node $130_3$. In this example, the PE 135 (labeled PE1), receives a tuple which includes attributes <name, department, salary, gender>. PE1 takes this N-tuple and generates one set of tuples sent to PE2 and another set of tuples sent to PE3, based on the gender value in a tuple received by PE1. In turn, PE2 and PE3 perform a database write for each tuple received from PE1 and generate a tuple of attributes <name, department, salary> sent to PE4. Once received, PE4 accesses a third-party web service and generates a tuple sent further downstream in the stream application.

Continuing the example, the compute nodes 130 may be configured with a SE component 245, according to embodiments of the invention. Generally, the SE component 245 may determine when incoming tuples of data may be processed in parallel, and on which processing elements 235. For instance, in the current example, the incoming tuple contains attributes NAME, DEPT., SALARY, and GENDER. Furthermore, as shown, processing elements PE2 and PE3 receive tuples containing the same attributes, but output a modified tuple containing attributes NAME, DEPT., and SALARY. As such, if the SE component 245 determines that PE1 does not modify the values of attributes NAME, DEPT., SALARY and GENDER, the SE component 245 may then determine that the incoming tuple may be processed on PE2 and PE3 in parallel to the processing by PE1.

As used herein, processing a tuple in parallel on two or more processing elements does not require that the processing by each of the processing elements start and stop at the same time, but only that there is some amount of temporal overlap between the sending to and/or processing by each of the processing elements. In other words, if processing by an exemplary second processing element begins before processing by an exemplary first processing element finishes, or even if a tuple is sent to the second processing element for processing before processing by the exemplary first processing element finishes, the processing would be said to be in parallel. Likewise, if the SE component 245 determines that none of the processing elements PE1, PE2 and PE3 modify the values of attributes NAME, DEPT., and SALARY, the SE component 245 may determine that the incoming tuple may be processed on all four processing elements PE1, PE2, PE3 and PE4 in parallel.

As a second example, assume that the depicted stream application is a payroll application, in which PE1 is tasked with calculating any annual raises for the incoming tuples containing employee data. In such an embodiment, if PE1 determines that employee qualifies for an annual raise, PE1 may modify the value of the SALARY attribute for an incoming tuple. As a result, if PE2, PE3 and PE4 all use the SALARY attribute in their processing, the SE component 245 may determine that none of the other processing elements PE2, PE3 and PE4 should be executed in parallel with PE1, because any processing performed by those processing elements would not take into account the updated salary value calculated by PE1. In other words, any such parallel processing of the received tuple on processing elements PE2, PE3 and PE4 would produce an invalid result.

In one embodiment of the invention, the SE component 245 may further base its determination on the likelihood that a processing element will modify the data in the tuple. For example, if raises are particularly rare one year because of a downturn in the economy, the SE component 245 may determine that it is unlikely that PE1 will modify the value of the SALARY attribute in the tuple. As such, in this example, the SE component 245 may process the incoming tuple in parallel on all four processing elements PE1, PE2, PE3 and PE4, because it is unlikely that PE1 will modify the data in the tuple and thus likely that the processing by PE2, PE3 and PE4 will produce valid results. Continuing this example, if PE1 determines a particular employee qualifies for a raise and thus modifies the value of the SALARY attribute in a received tuple, then the values calculated by PE2, PE3 and PE4 may simply be discarded and then recalculated using the result tuple generated by the processing of PE1.

Of course, the SE component 245 may take other factors into account as well in determining whether to process a particular tuple in parallel. For instance, even if a particular processing element 235 does not modify the attributes of a tuple when processing the tuple, the processing element 235 may not always generate a result tuple. As an example, in the exemplary payroll processing application discussed above, the stream application may be designed to only process the data of non-executive employees. If PE1 then receives a tuple where the DEPT. attribute has the value "EXECUTIVE," PE1 may be configured to simply discard such a tuple and not generate any result tuples. In such an example, the results of any parallel processing done on the other processing elements PE2, PE3 and PE4 would also be discarded. As such, the SE component 245 may be further configured to estimate the likelihood that the processing by PE1 will actually produce a result, and to use the likelihood in determining whether to process the incoming tuple in parallel on other processing elements 235. That is, if it is very unlikely that PE1 will produce a result tuple, it may be inefficient or wasteful to execute any operations in parallel using the other processing elements, as the results of those parallel operations would likely be discarded.

Figure 5:
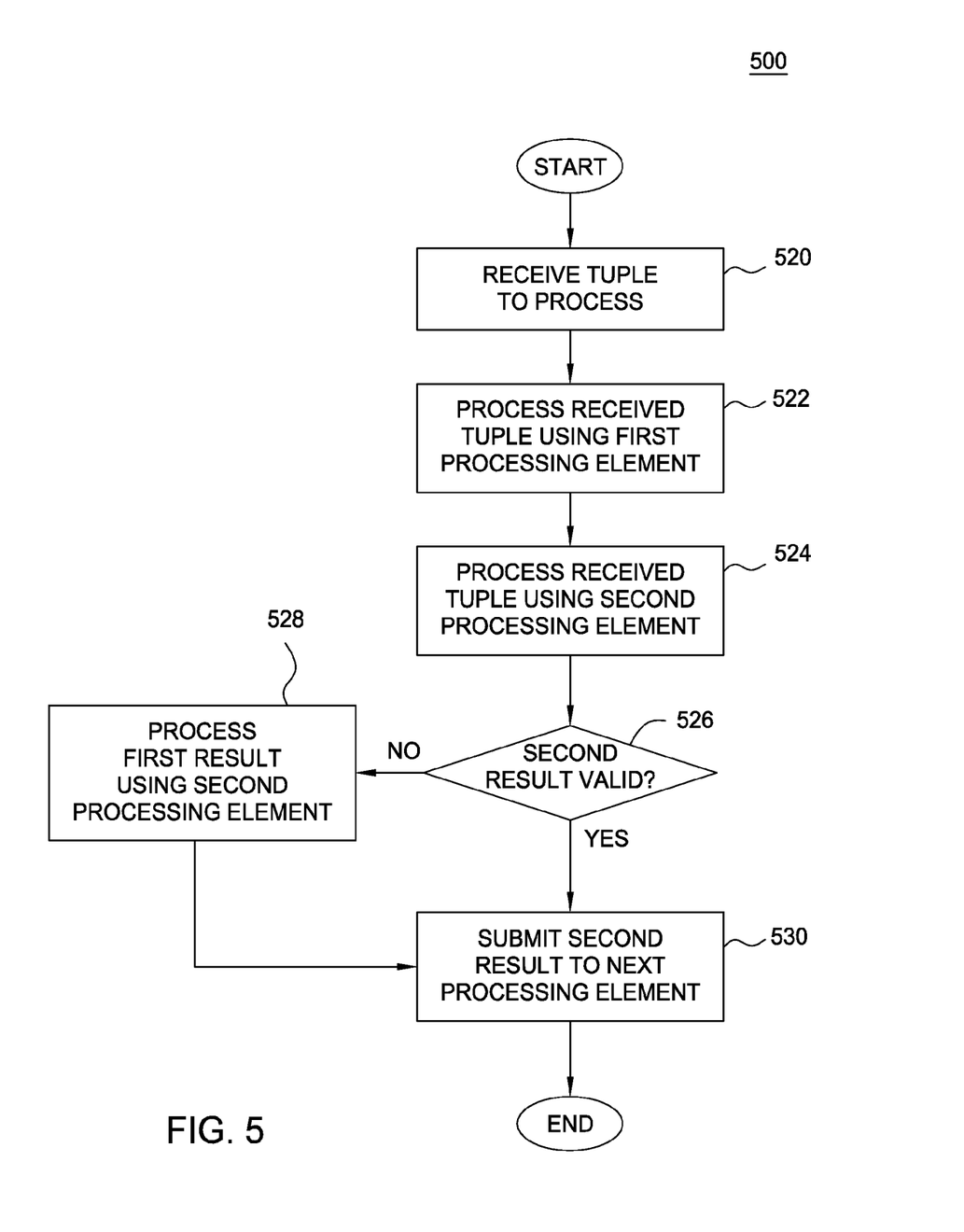
FIG. 5 is a flow diagram illustrating a method of speculatively executing operations, according to one embodiment of the invention.

FIG. 5 is a flow diagram illustrating a method of speculatively executing operations, according to one embodiment of the invention. As shown, the method 500 begins at step 520, where the SE component 245 receives a tuple to process. In one embodiment, the tuple may be sent directly to the SE component 245. In an alternate embodiment, the SE component 245 may intercept tuples sent to a processing element 235, before they are received by the processing element 235.

Once the SE component 245 receives the tuple, the SE component 245 submits the tuple to a first processing element for processing (step 522). Generally, as used here, the first processing element simply refers to the processing element specified for processing the tuple, according to an execution path of the stream application (e.g., the flow specified by the primary operator graph 335). As such, the term first processing element may refer to any processing element in the stream application.

Once the first processing element begins processing the received tuple, the SE component 245 submits the tuple to a second processing element for processing in parallel with the first processing element (step 524). As used here, the second processing element refers to any processing element designated to process the tuple subsequent to the first processing element, according to the execution path of the stream application. Thus, using the example shown in FIG. 4, the first processing element may refer to PE1, while the second processing element may refer to PE2. Furthermore, the second processing element does not necessarily refer to the processing element scheduled to process the tuple immediately following the processing of the tuple by the first processing element. In other words, there may be one or more other processing elements that process the tuple after the first processing element finishes processing the tuple, and before the second processing element is scheduled to begin processing the tuple. Thus, again using the example depicted in FIG. 4, the first processing element may refer to PE1, the second processing element may refer to PE4.

Once the first processing element finishes processing the received tuple, the SE component 245 determines whether the result of the second processing element's processing will be valid (or if the second processing element has finished processing the tuple, whether the result of the second processing element's processing is valid) (step 526). The SE component 245 may base this decision on, for instance, whether the processing by the first processing element modified the received tuple in a relevant way. For example, if the processing by the first processing element modified an attribute in the tuple that the second processing element uses in its processing, the SE component 245 may determine that the result produced by the second processing element is invalid, because it was produced using the original tuple and not the modified tuple. Upon determining that the result produced by the second processing element is invalid, the SE component 245 submits the tuple resulting from the first processing element's processing to the second processing element (step 528). The second processing may then perform its operations on the modified tuple and produce a valid result.

Alternatively, if the processing by the first processing element did not modify the tuple or if the processing modified the tuple in an immaterial way (e.g., the processing modified an attribute in the tuple not used by the second processing element), the SE component 245 submits the result of the processing by the second processing element to the next processing element, according to the execution path of the stream application (step 530). Thus, continuing the example depicted in FIG. 4, once PE2 finishes processing the tuple and if the SE component 245 determines the result is a valid result, the SE component 245 may then submit the result to PE4 for further processing.

Advantageously, the method 500 may improve the efficiency of a stream application by processing incoming stream data in parallel. For example, assume the second processing element is not operating at maximum workload while the first processing element is processing the received tuple. By processing the received tuple in parallel on both the first processing element and the second processing element, the method 500 may take advantage of the unutilized resources on the second processing element, and thus improve performance of the stream application as a whole. Furthermore, even if embodiments of the invention determine that the result of the second processing element's parallel processing is invalid (e.g., at step 526), the second processing element would merely process the result of the first processing element's processing, as would normally be done in a stream application. That is, while in many cases the method 500 may improve the performance of a stream application, even when the parallel processing produces an invalid result, the performance of a stream application using the method 500 is the same as a stream application not using the method 500.

Figure 6:
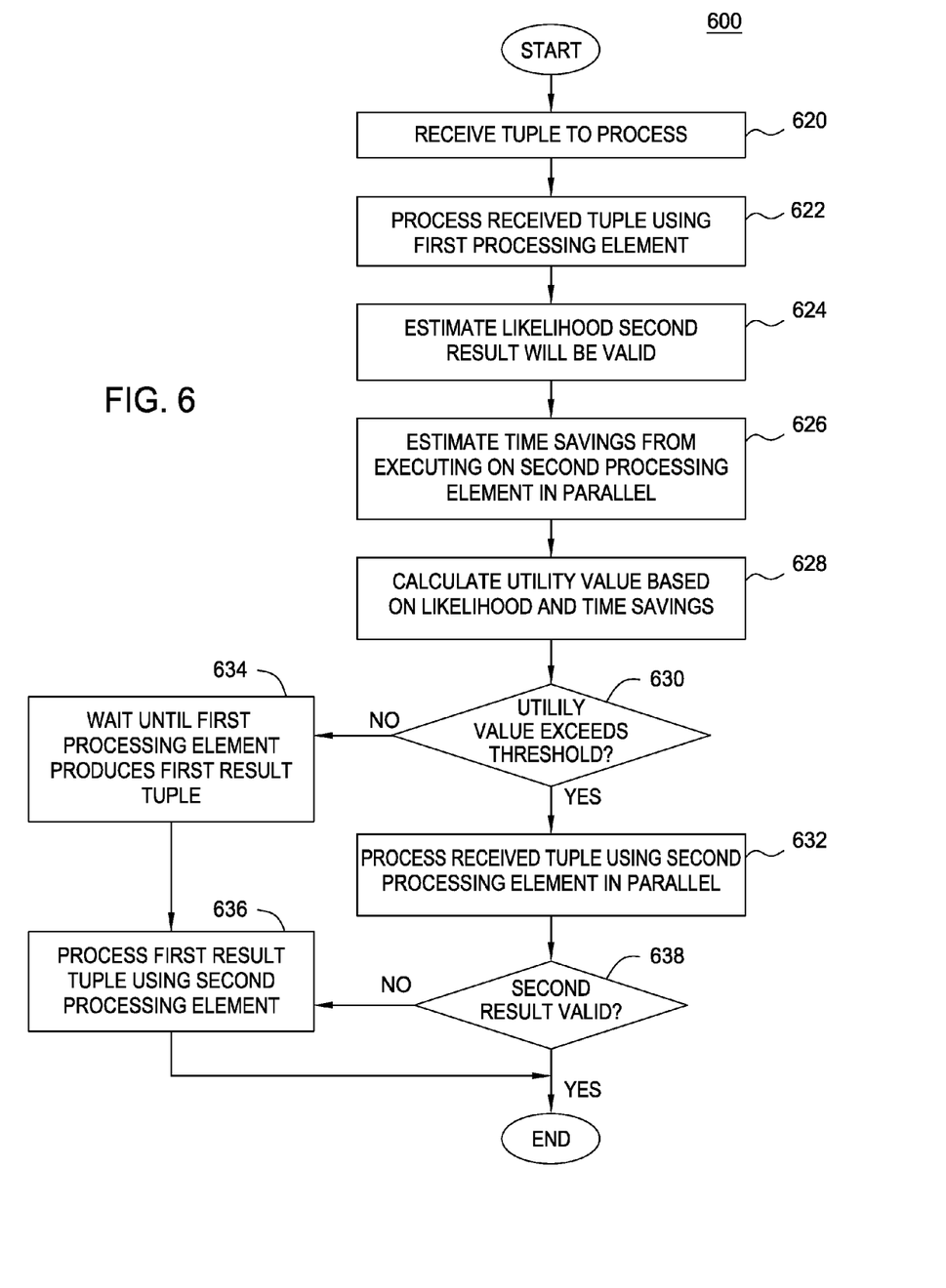
FIG. 6 is a flow diagram illustrating a method of speculatively executing operations, according to one embodiment of the invention.

FIG. 6 is a flow diagram illustrating a method of speculatively executing operations, according to one embodiment of the invention. As shown, the method 600 begins at step 620, where the SE component 245 receives a tuple to process. In one embodiment, the tuple may be sent directly to the SE component 245. In an alternate embodiment, the SE component 245 may intercept tuples sent to a processing element 235, before they are received by the processing element 235.

Once the SE component 245 receives the tuple, the SE component 245 submits the tuple to a first processing element for processing (step 622). Similar to the discussion regarding FIG. 5, the first processing element as used here simply refers to the processing element specified for processing the tuple, according to the execution path of the stream application (e.g., the flow specified by the primary operator graph 335), that has at least one other processing element after it in the execution path. As such, using the exemplary stream application shown in FIG. 4, the term first processing element may refer to any processing element in the stream application other than PE4.

Once the first processing element begins processing the received tuple, the SE component 245 estimates a likelihood that a second processing element would produce a valid result, if executed on the received tuple (step 624). The SE component 245 may determine the likelihood based on historical data saved from previously processed tuples. For example, if the second processing element produced a valid result in 9 out of 10 similar previously-processed tuples, the SE component 245 may determine a 90% likelihood of producing a valid result for the current tuple. The SE component 245 may also take into account other factors in making this determination. Exemplary factors include, without limitation, one or more attributes in the tuple, the value of one or more attributes in the tuple, and collected metadata describing the tuple.

Once the SE component 245 estimates the likelihood of the second processing element producing a valid result, the SE component 245 then estimates a time savings from executing operations on the second processing element in parallel with the first processing element (step 626). The SE component 245 then calculates a utility value for executing the received tuple on the second processing element in parallel with the first processing element, based on the estimated likelihood of validity and the estimated time savings value (step 628). For example, when there is a high likelihood that the parallel processing with produce a valid result, and the time savings of the parallel processing are substantial, the SE component 245 may determine that the parallel processing has a very high utility value. On the other hand, if the parallel processing will save the stream application very little time and has a small chance of producing a valid result, the SE component 245 may determine that the parallel processing has very little utility.

Once the utility value is calculated, the SE component 245 determines whether the utility value exceeds a threshold amount of utility (step 630). The threshold value may be a predetermined value or a derived value. For example, the SE component 245 may calculate a different threshold amount during peak processing hours for the stream application versus at off-peak processing hours. That is, because it is less likely that the stream application will have idle processing elements during peak processing hours, the SE component 245 may be more risk-averse in regard to wasted resources and thus may set a higher threshold amount of utility. In contrast, during off-peak processing hours when the stream application will more likely have idle or underutilized processing elements, the SE component 245 may be more willing to take risks in regard to the workload and thus may set a lower threshold amount.

If the SE component 245 determines that the utility value does not exceed the threshold value, the SE component 245 allows processing of the tuple to continue using the normal flow of the stream application (e.g., based on the primary operator graph 335). Thus, in the depicted example, the SE component 245 waits until the first processing element has completed processing the received tuple and generated a first result tuple (step 634). One the first result tuple is generated, the SE component 245 submits the first result tuple to the second processing element for processing (step 636).

If the SE component 245 determines the utility value exceeds the threshold value, the SE component 245 submits the received tuple to the second processing element for processing (step 632). Once the received tuple is submitted to the second processing element for processing, and once the first processing element finishes processing the received tuple, the SE component 245 determines whether the result of the processing by the second processing element is (or will be, if the processing has not completed yet) valid (step 638). If the SE component 245 determines the result produced by the second processing element will not be valid, the SE component 245 submits the first result tuple produced by the first processing element to the second processing element for processing (step 636). Once the SE component 245 determines the result is valid, or once the SE component 245 submits the first result tuple to the second processing element for processing, the method 600 ends.

Advantageously, the method 600 may improve the performance of a stream application by executing operations on incoming tuples in parallel. In addition, the method 600 only calculates operations on a received tuple in parallel when those operations are determined to provide sufficient utility to the stream application. That is, according to the method 600, the SE component 245 only executes operations in parallel if the results of the parallel operations are likely to be valid, or if the stream application would save a substantial amount of time by processing the tuple in parallel, or a combination thereof. As such, in addition to improving the performance of the stream application, the method 600 avoids wasting processing resources.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for processing a data stream, comprising:
    executing, by operation of one or more computer processors, a first operation on a first tuple of the data stream by a first processing element to produce a first result tuple;
    upon determining that a likelihood that a second operation will be valid if executed on the first tuple in parallel with the first operation exceeds a predetermined threshold value, executing the second operation on the first tuple of the data stream by a second processing element, wherein the second operation is executed in parallel with the first operation;
    determining one or more attributes of the first tuple used in executing the second operation on the second processing element; and
    comparing the determined one or more attributes of the first tuple with attributes of the first result tuple produced from executing the first operation by the first processing element, to determine whether the second operation executed by the second processing element is valid.

2. The method of claim 1, further comprising:
    upon determining the second operation is invalid:
        discarding a second result tuple, wherein the second result tuple is produced from executing the second operation on the first tuple of the data stream on the second processing element; and
        executing the second operation on the first result tuple on the second processing element.

3. The method of claim 1, wherein determining the likelihood that the second operation will be valid, further comprises:
    determining a second likelihood that the first operation modifies at least one attribute in the first tuple of the data stream.

4. The method of claim 1, wherein comparing the determined one or more attributes of the first tuple with attributes of the first result tuple to determine whether the second operation is valid, is further based on at least one of (i) whether the first result tuple contains fewer attributes than the first tuple of the data stream, (ii) whether the first result tuple contains more attributes than the first tuple of the data stream, and (iii) which attributes in the first tuple of the data stream are modified by the first operation.

5. The method of claim 1, further comprising:
    calculating a time savings value for executing the second operation in parallel with the first operation, wherein the second operation is executed only when the time savings value exceeds a predetermined threshold value.

6. A computer-implemented method of processing a data stream, comprising:
    executing a first operation on a first tuple of the data stream by a first processing element;
    calculating a utility value for executing a second operation on the first tuple of the data stream by a second processing element in parallel to executing the first operation by the first processing element, wherein the utility value is based on (i) a likelihood that the second operation will be valid if executed on the first tuple in parallel with the first operation and (ii) a time savings value for executing the second operation in parallel with the first operation;
    upon determining the calculated utility value exceeds a threshold utility value, executing the second operation on the first tuple of the data stream by the second processing element, wherein the second operation is executed in parallel with the first operation; and
    determining whether a result of the second operation is valid, based on whether the first operation modified the first tuple.

7. The method of claim 6, further comprising:
    upon determining the second operation is invalid, executing the second operation on a first result tuple produced from executing the first operation by the first processing element, by the second processing element.

8. The method of claim 6, wherein calculating the utility value for processing the first tuple of the data stream by the second processing element in parallel to executing the first operation, further comprises:
- determining the likelihood that executing the second operation will produce a valid result; and
- calculating the time savings value for executing the second operation in parallel with the first operation, wherein the second operation is executed only when the time savings value exceeds a predetermined threshold value.

9. The method of claim 8, wherein determining a likelihood that the second operation will produce a valid result is further based on historical data collected from previously-processed tuples on the first processing element.

10. The method of claim 9, wherein the historical data includes at least one of (i) a likelihood the first result tuple is produced, (ii) a likelihood one or more attributes are changed, and (iii) a likelihood one or more attributes are added, and (iv) a likelihood one or more attributes are removed.

11. A computer-implemented method for processing a data stream, comprising:
- executing, by operation of one or more computer processors, a first operation on a first tuple of the data stream by a first processing element to produce a first result tuple;
- executing a second operation on the first tuple of the data stream by a second processing element, wherein the second operation is executed in parallel with the first operation;
- determining one or more attributes of the first tuple used in executing the second operation on the second processing element; and
- comparing the determined one or more attributes of the first tuple with attributes of the first result tuple produced from executing the first operation by the first processing element, to determine whether the second operation executed by the second processing element is valid, based on at least one of (i) whether the first result tuple contains fewer attributes than the first tuple of the data stream, (ii) whether the first result tuple contains more attributes than the first tuple of the data stream, and (iii) which attributes in the first tuple of the data stream are modified by the first operation.

* * * * *